(12) United States Patent
Fedigan et al.

(10) Patent No.: US 10,598,926 B2
(45) Date of Patent: Mar. 24, 2020

(54) OPTICAL DEVICE HOUSING

(71) Applicant: TEXAS INSTRUMENTS INCORPORATED, Dallas, TX (US)

(72) Inventors: Stephen John Fedigan, Plano, TX (US); David Patrick Magee, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 91 days.

(21) Appl. No.: 15/696,752

(22) Filed: Sep. 6, 2017

(65) Prior Publication Data

US 2018/0224656 A1 Aug. 9, 2018

Related U.S. Application Data

(60) Provisional application No. 62/454,972, filed on Feb. 6, 2017.

(51) Int. Cl.
*G02B 27/00* (2006.01)
*H04N 5/225* (2006.01)

(52) U.S. Cl.
CPC ....... *G02B 27/0006* (2013.01); *H04N 5/2252* (2013.01)

(58) Field of Classification Search
None
See application file for complete search history.

(56) References Cited

U.S. PATENT DOCUMENTS

| 7,929,052 | B2 | 4/2011 | Chen et al. | |
| 2007/0217786 | A1* | 9/2007 | Cho | G03B 17/00 |
| | | | | 396/542 |
| 2012/0243093 | A1 | 9/2012 | Tonar et al. | |
| 2014/0043944 | A1* | 2/2014 | Wilt | G10K 9/122 |
| | | | | 367/180 |
| 2017/0361360 | A1 | 12/2017 | Li et al. | |
| 2018/0031826 | A1 | 2/2018 | Fedigan et al. | |
| 2018/0085784 | A1 | 3/2018 | Fedigan et al. | |
| 2018/0085793 | A1 | 3/2018 | Fedigan et al. | |
| 2018/0117642 | A1 | 5/2018 | Magee et al. | |
| 2018/0154406 | A1 | 6/2018 | Magee et al. | |
| 2018/0188526 | A1 | 7/2018 | Li et al. | |
| 2018/0224656 | A1 | 8/2018 | Fedigan et al. | |

\* cited by examiner

*Primary Examiner* — Jennifer D. Carruth
(74) *Attorney, Agent, or Firm* — Michael A. Davis, Jr.; Charles A. Brill; Frank D. Cimino

(57) ABSTRACT

An apparatus for mitigating contamination of an optical device comprises an open-topped, closed-sided, and closed-bottomed housing cup partially defining a protected volume to enclose the optical device. A housing cap encloses a top of the housing cup and partially defines the protected volume. The housing cap includes a top collar having an open central aperture. The top collar includes at least one drain channel extending longitudinally downward into a top collar top surface and extending across the top collar top surface laterally outward from the central aperture. A top cover laterally spans the central aperture of the top collar. An interface structure circumscribes the top cover to suspend the top cover downwardly into the housing cup from the top collar. The interface structure prevents direct contact between the top cover and the top collar.

19 Claims, 6 Drawing Sheets

OPTICAL DEVICE HOUSING

RELATED APPLICATION

This application claims priority from U.S. Provisional Application No. 62/454,972, filed 6 Feb. 2017 and entitled LENS COVER HOUSING WITH DRAIN CHANNEL, the subject matter of which is incorporated herein by reference in its entirety.

This application is related to the following co-owned co-pending U.S. Patent Application: U.S. patent application Ser. No. 15/377,492, filed Dec. 13, 2016.

TECHNICAL FIELD

This disclosure relates to an apparatus and method for mitigating contamination of an optical device and, more particularly, to a method and apparatus for use of an optical device housing.

BACKGROUND

For use environments such as vehicle backup cameras, it may be desirable to enclose an optical device in a housing to protect the optical device from contaminants including fluids, particles, and other unwanted matter. However, the optical device should still be in visual contact with the ambient space outside the housing for many such use environments. The optical devices are often too small to warrant the expense and inconvenience of a transversely-wiping squeegee or other mechanically contacting clearance devices. As a result, an ultrasonic transducer may be provided to longitudinally and/or laterally vibrate a transparent cover portion of the housing along an axis of the lens. The cover vibration occurs at very high frequencies, and acts to break up liquid surface tension, overcome adhesion due to electrostatic and/or Van der Waals forces, and otherwise shake contaminants away from the outer cover surface. However, this ultrasonic vibration can be damaging to various portions of the housing and the enclosed optical device (or components associated therewith), due to unwanted ultrasonic welding effects and/or mechanical wear.

SUMMARY

As one example, an apparatus for mitigating contamination of an optical device is described. The apparatus comprises an open-topped, closed-sided, and closed-bottomed housing cup partially defining a protected volume to enclose the optical device. A housing cap encloses a top of the housing cup and partially defines the protected volume. The housing cap includes a top collar having an open central aperture. The top collar includes at least one drain channel extending longitudinally into a top collar top surface and extending at least partially across the top collar top surface laterally outward from the central aperture. A top cover laterally spans the central aperture of the top collar. An interface structure circumscribes the top cover to suspend the top cover into the housing cup from the top collar. The interface structure prevents direct contact between the top cover and the top collar.

As another example, an optical device housing is described. A sidewall has longitudinally spaced top and bottom sidewall rims. The sidewall encloses a lateral dimension of a protected volume. A bottom plate laterally spans the bottom sidewall rim to enclose a bottom side and lower longitudinal dimension of the protected volume. A housing cap includes a top cover laterally spanning a portion of the top sidewall rim to partially enclose a top side and upper longitudinal dimension of the protected volume. The top cover is laterally separated from the top sidewall rim by an insulation gap. A top collar laterally surrounds the top sidewall rim. The top collar laterally spans the insulation gap to complete longitudinal enclosure of the top side of the protected volume. The top collar includes at least one drain channel extending longitudinally downward into a top collar top surface. An interface structure is at least partially located longitudinally between the top cover and the top collar and prevents direct contact therebetween.

DETAILED DESCRIPTION

This disclosure relates to a lens cover housing. Unless defined otherwise, all technical and scientific terms used herein have the same meaning as is commonly understood by one of skill in the art to which the present disclosure pertains.

As an example, the housing includes a sidewall enclosing a lateral dimension of a protected volume. A bottom plate laterally spans the sidewall to enclose a bottom side and lower longitudinal dimension of the protected volume. The housing also includes a housing cap having a top cover, a top collar including a drain channel, and an interface structure at least partially located longitudinally between the top cover and the top collar and preventing direct contact therebetween. For example, the interface structure may include, or be at least partially made from, a compliant material that prevents contact forces associated with the housing from damping or suppressing vibrations from a structure inside the protected volume. The housing may at least partially seal water and other contaminants from reaching the protected volume, may facilitate drainage of fluid, and may mitigate short-circuiting of electronics within the housing. The housing can be inexpensive to manufacture and simple to assemble. The housing may also provide a simple and reliable way to electrically connect structures and components within the protect volume and outside the housing, in a surrounding ambient space.

Figure 1:
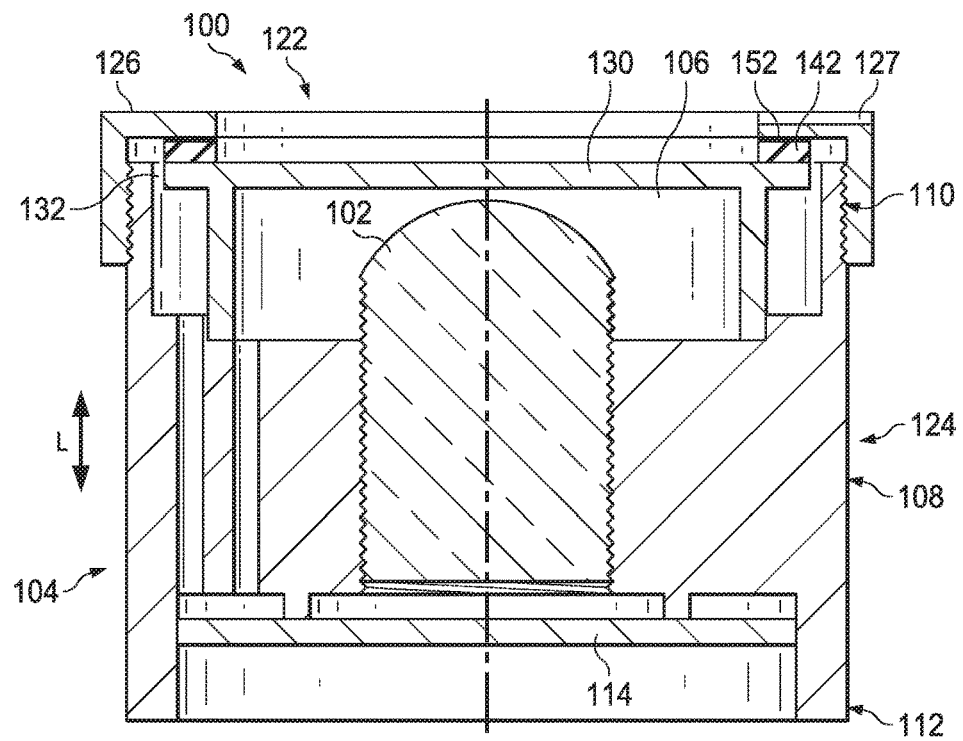
FIG. 1 is a schematic cross-sectional side view of an example apparatus for mitigating contamination of an optical device.

FIG. 1 depicts an example of an apparatus 100, shown here as an optical device housing, for mitigating contamination of an optical device 102 that resides within the housing. The apparatus 100 includes an open-topped, closed-sided, and closed-bottomed housing cup 104 partially defining a protected volume 106 to enclose the optical device 102.

The housing cup 104 includes a sidewall 108 having longitudinally spaced top and bottom sidewall rims 110 and 112. The "longitudinal" direction, as shown and described herein, is substantially parallel to longitudinal arrow "L", which is substantially along the vertical direction, in the orientation of FIG. 1. The sidewall 108 encloses a lateral dimension of the protected volume 106. The "lateral" direction, as shown and described herein, is substantially perpendicular to longitudinal arrow "L", and is substantially along the horizontal direction, in the orientation of FIG. 1. Spatially relative terms, such as "under," "below," "lower," "over," "upper", "up", "down", "top", "bottom", and the like, may be used herein for ease of description to describe one element or feature's relationship to another element(s) or feature(s) as illustrated in the Figures. It will be understood that the spatially relative terms can encompass different orientations of a device in use or operation, in addition to the orientation depicted in the figures.

Figure 2:
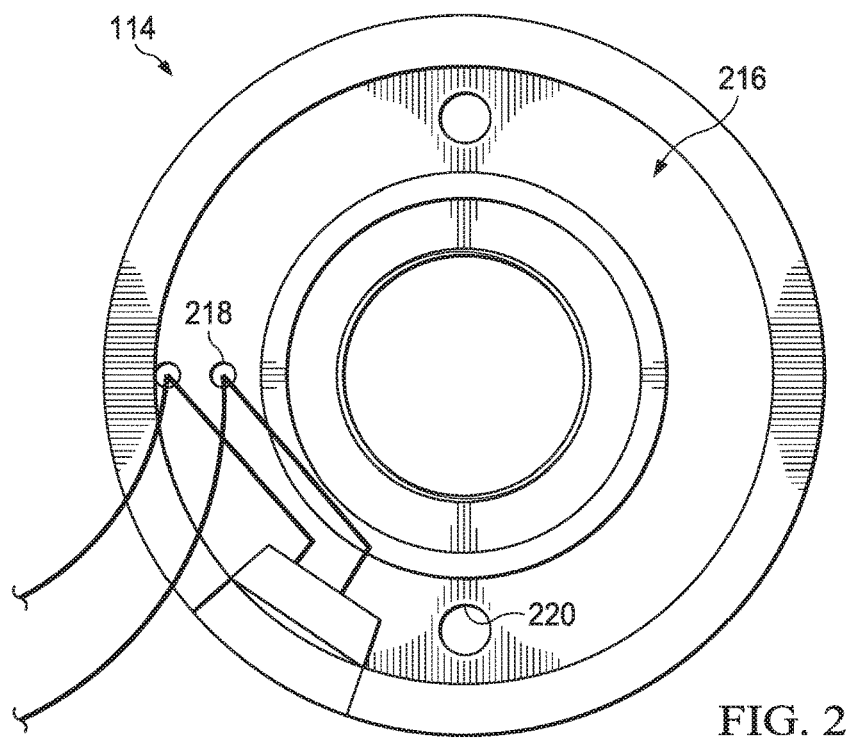
FIG. 2 is a schematic bottom view of the apparatus of FIG. 1.

A bottom plate 114 (such as a bottom cover), shown from the bottom in FIG. 2, laterally spans the bottom sidewall rim 112 to enclose a bottom side and lower longitudinal dimension of the protected volume 106. The bottom side of the housing cup 104 (i.e., the bottom plate 114) may include at least one of a via 218, a thru hole 220, and a PCB 216 for at least one of mechanical and electrical communication longitudinally through the housing cup to provide a path for electrical communication (between an ambient space and the protected volume 106) longitudinally through the PCB 216. When present, the vias 218 and/or thru holes 220 (each of which may be considered to be a form of a lumen, and any of which may be provided to a PCB 216, panel, or other portion of the housing) may be configured (such as through the use of epoxy potting or any other desired treatment) to prevent ingress of contaminants to the protected volume 106 through the bottom plate 114. However, when the bottom side of the apparatus 100 is located within a larger housing or mounting structure, such protection of the vias 218 and/or thru holes 220 may be selectively omitted. It is contemplated that the optical device 102 could be directly attached to the PCB 216, when one is present. It is also contemplated that a transformer (not shown) could be directly or indirectly attached to the PCB 216, or to any other part of the apparatus 100, in any desired manner.

The bottom plate 114 or cover, regardless of whether or not a PCB 216 forms at least a portion thereof, may include at least one thru hole 220 extending therethrough to facilitate at least one of mechanical and electrical communication between the ambient space surrounding the apparatus 100 and the protected volume 106. For example, the thru hole 220 can enable electrical communication of signals (e.g., video image data) between the optical device 102 located inside the protected volume 106 and a remote device (not shown) configured to receive and process signals from the optical device. As another example, power and/or signal (similar to a speaker setup) could be provided to the optical device 102, an ultrasonic transducer, and/or any other component of the apparatus 100 via the thru hole 220.

As shown in the example of the Figures, the bottom plate 114 may be recessed up into the housing cup 104 any desired amount, or in other examples may instead be flush with the bottommost edge of the housing cup 104.

With reference once again to FIG. 1, a housing cap 122 encloses a top (e.g., the top sidewall rim 110) of the housing cup 104 and thus partially encloses an upper longitudinal dimension of the protected volume 106. That is, the housing cap 122 laterally spans the top of the housing cup 104. The housing cap 122 may be attached laterally and/or longitudinally to an outer sidewall 124 of the housing cup 104.

Figure 3:
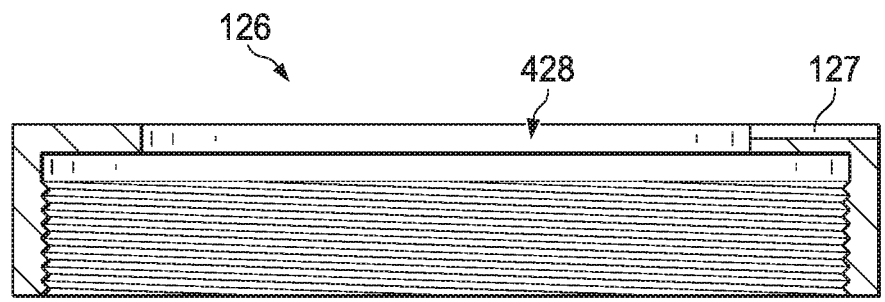
FIG. 3 is a schematic cross-sectional side view of an example component of the apparatus of FIG. 1.
Figure 4:
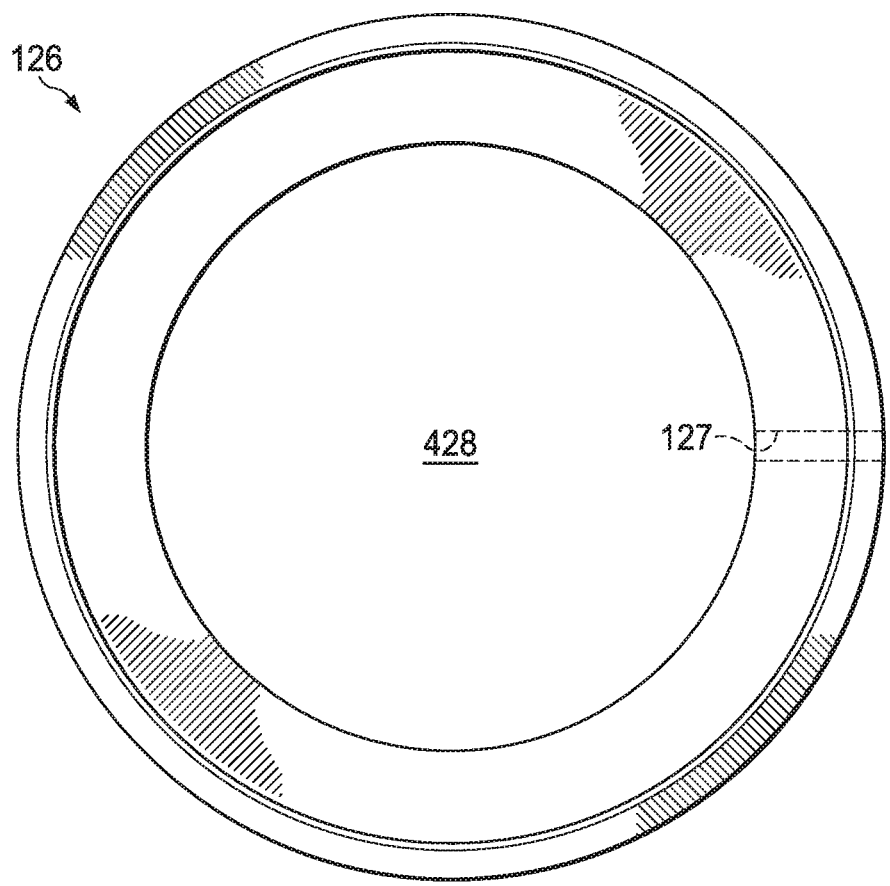
FIG. 4 is a schematic bottom view of the component of FIG. 3.

The housing cap 122 includes a top collar 126, shown in cross-sectional side view in FIG. 3 and from the bottom in FIG. 4. The top collar 126 has an open central aperture 428, shown in FIG. 4. The top collar 126 laterally surrounds the top sidewall rim 110. In some examples, such as shown in the Figures, the top collar 126 may be threadably attached to the sidewall 108 at the top sidewall rim 110. The top collar 126 may include at least one drain channel 127 (one shown in FIGS. 1-10), which extends longitudinally downward into the top collar 126 top surface and extends at least partially across the top collar 126 top surface laterally outward from the central aperture 428. Each drain channel 127 may have any desired size and shape, though is shown as a flat-bottomed, constant cross-section void in the top collar 126 top surface in the Figures. Other examples of suitable configurations for the drain channel 127 include, but are not limited to: tapering the cross-section of the void in any desired direction/orientation (e.g. gradually or abruptly increasing the "depth" of the drain channel 127 into the top collar 126 top surface along the length of the drain channel 127 as the drain channel 127 extends toward or away from the central aperture 428); providing a drain channel 127 which is wedge- or even triangle-shaped in cross-section, with the topmost portion of the drain channel 127 (i.e., the portion substantially flush with the top collar 126 top surface) being either wider or narrower than the bottommost portion of the void; and/or the drain channel 127 could have an at least partially rounded/cylindrical cross-section (e.g., round-bottomed) rather than the rectilinear cross-section shown in the Figures. Likewise, the central aperture 428 could have a particular configuration at least at the interface with the drain channel 127. For example, the drain channel 127 could meet the central aperture 428 at approximately a right angle, as shown in the Figures, or at least a portion of the sidewall of the central aperture 428 which interfaces with the drain channel 127 could be positively or negatively angled with respect to the top surface of the top collar 126. Each drain channel 127 may be radially aligned with the central aperture 428 (or with the top collar 126 generally) to extend along a line passing through a radial center of the central aperture 428 (or the top collar 126 generally), or could be offset as desired to extend tangentially with respect to the radial center of the central aperture 428 (or the top collar 126 generally). The drain channel 127 facilitates drainage of fluid from the central aperture toward the outer surface of the housing cup 104. For example, such drainage via channel 127 may occur under gravitational influence when the apparatus 100 is mounted with the longitudinal direction being substantially horizontal to a ground surface during use. The fluid drainage through the drain channel 127 may be facilitated further by vibration or other movement of a vehicle or other object to which the apparatus 100 is attached.

Figure 5:
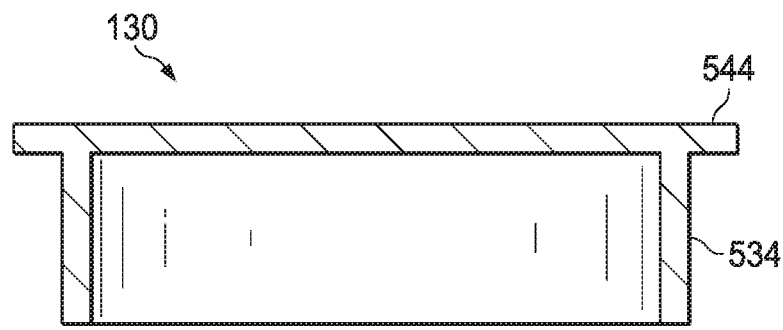
FIG. 5 is a schematic cross-sectional side view of an example component of the apparatus of FIG. 1.
Figure 6:
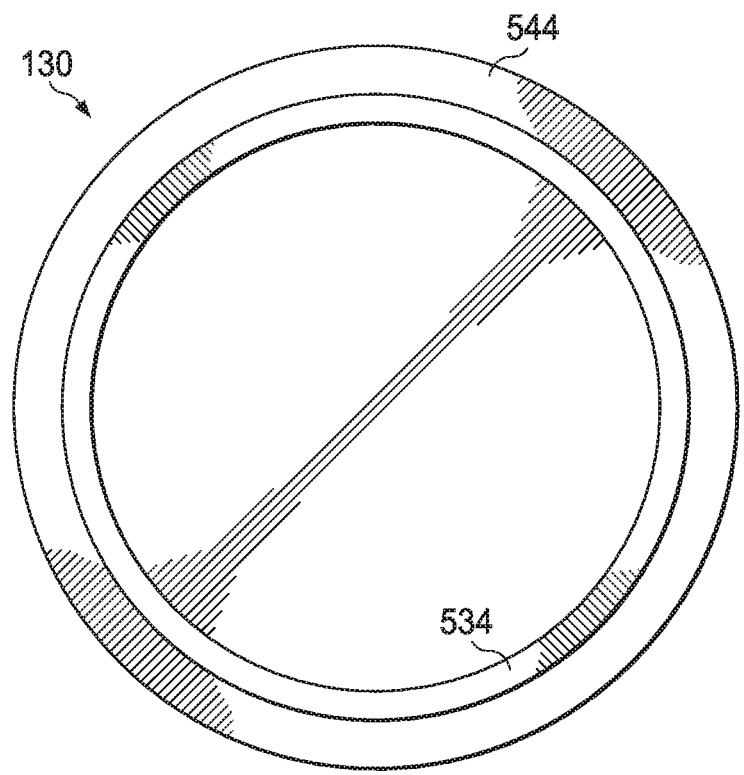
FIG. 6 is a schematic bottom view of the component of FIG. 5.

The housing cap 122 also includes a top cover 130, shown in cross-sectional side view in FIG. 5 and from the bottom in FIG. 6. The top cover 130 laterally spans the central aperture 428 of the top collar 126. The top cover 130 laterally spans at least a portion of the top sidewall rim 110 to partially enclose a top side and upper longitudinal dimension of the protected volume 106. At least a portion of the top cover 130 may be at least one of optically transparent and optically translucent, to allow an optical device 102 contained within the protected volume 106 to make a desired amount of visual contact with the ambient space around the apparatus 100.

The top cover 130 is laterally separated from the top sidewall rim 110 by an insulation gap 132. The top collar 126 laterally spans the insulation gap 132 to complete enclosure of the top side and the longitudinal dimension of the protected volume 106, in combination with the top cover 130 to collectively comprise the housing cap 122. The top cover 130 includes an ultrasonic transducer 534, shown in at least FIG. 5 as a cylindrical annular ultrasonic transducer, such as, but not limited to, such as piezoelectric cylinder SMC22D20H6412 (available from Steiner & Martins, Inc. of Doral, Fla.), for selectively ultrasonically vibrating the top cover 130 to shed contaminants. The ultrasonic transducer 534 vibrates the top cover 130 longitudinally up and down and/or laterally left-to-right (in the orientation of FIG. 1) at very high frequencies (e.g., between about 20 to about 400 kHz, for example, such as about 300 kHz) to mitigate contamination of the optical device by vibrating contaminants away from and off of the top cover 130. In this way, where the optical device 102 constitutes a camera, by removing contaminants, such as water and dirt from the top cover, the field of view for the camera may be cleared of obstructions.

Figure 7:
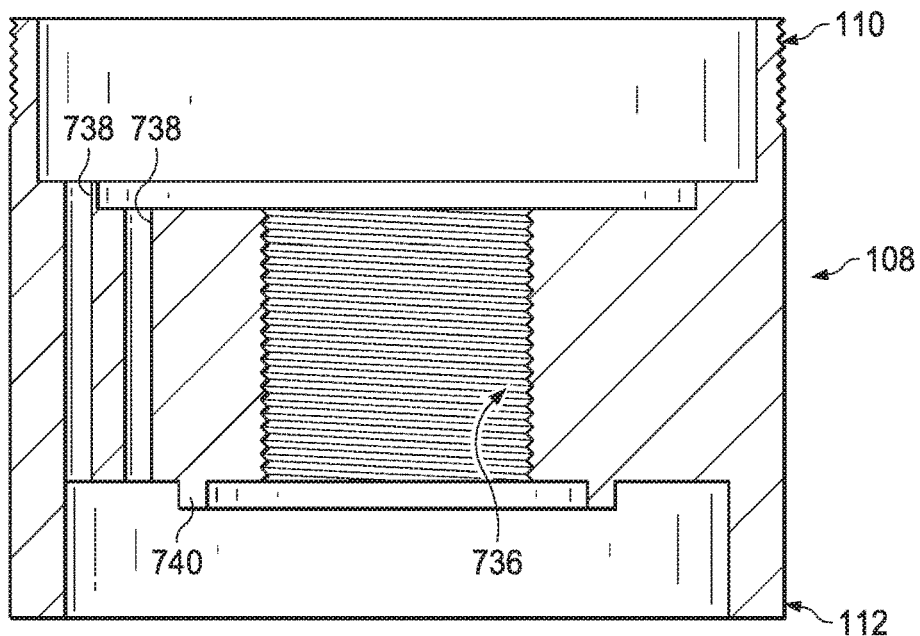
FIG. 7 is a schematic cross-sectional side view of another example component of the apparatus of FIG. 1.
Figure 8:
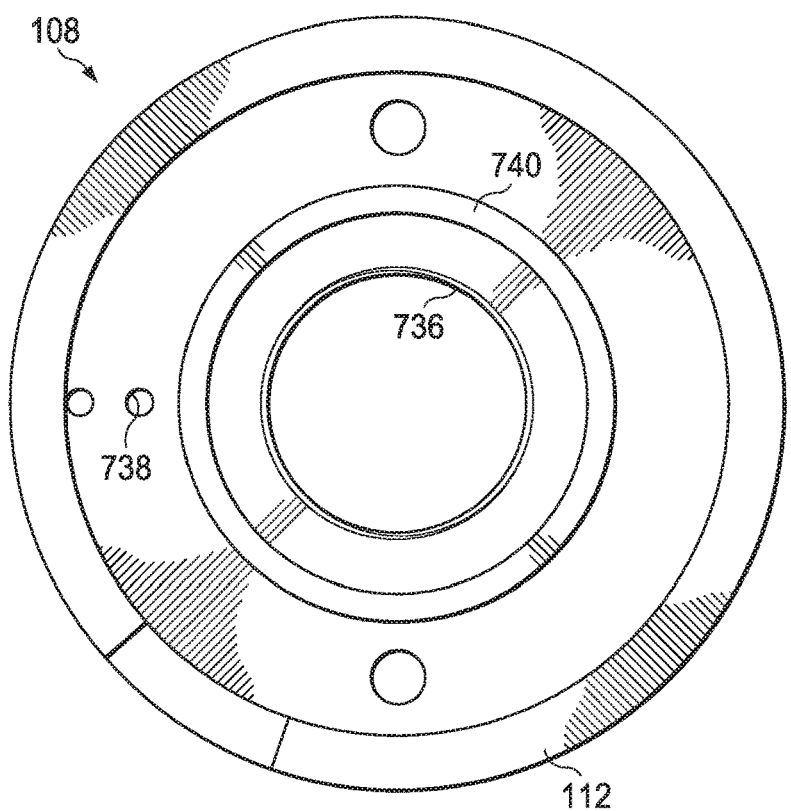
FIG. 8 is a schematic bottom view of the component of FIG. 7.

The sidewall 108 is shown in cross-sectional side view in FIG. 7 and from the bottom in FIG. 8. As shown in FIG. 7, the sidewall 108 may include a laterally thickened center segment 736 which protrudes laterally into the protected volume 106. The center segment 736 may be helpful, for example, in laterally orienting an optical device 102 and/or in longitudinally orienting the housing cap 122, or portions thereof, with respect to other structures of the apparatus 100.

One or more longitudinal lumens 738 (each of which could act as a via 218 and/or thru hole 220) could extend through the center segment 736, or through any other portion of the sidewall 108, to provide a path for communication (e.g., passage of a wire, not shown) between the top and bottom sidewall rims 110 and 112 within the protected volume 106. For example, electrical wires (not shown) could extend through one or more longitudinal lumens 738 between the ultrasonic transducer 534 and at least one via 218.

One or more alignment features 740 could be associated with the center segment 736, or with any other portion of the sidewall 108, to facilitate alignment and/or attachment of the apparatus 100 structures relative to each other. For example, as shown in FIGS. 7-8, at least one alignment feature 740 can be a protruding feature configured for male-to-female contact with at least one thru hole 220 of the bottom plate 114. The depicted alignment feature 740 may serve as, and/or receive, a fastener (not shown) to attach the sidewall 108 to the bottom plate 114.

The sidewall 108, the bottom cover (e.g., bottom plate 114), the top cover 130, the top collar 126, and/or any other structures of the apparatus 100 may be made of a nonconductive material, such as, but not limited to, acetal homopolymer resin, high density polyethylene, polytetrafluoroethylene, other plastic or polymer materials, nonconductive metals, or any combination thereof. For certain use environments, it may be desirable for at least one structure of the apparatus 100 to be made of a material which is not subject to unwanted ultrasonic welding under vibratory forces induced by the ultrasonic transducer 534. It may also or instead be desirable for the apparatus 100, or portions thereof, to be nonconductive to avoid electrical short circuits if, for example, the insulation of an electrical wire frays or wears over time under the vibratory load to expose the bare wire to adjacent and/or contacting structures of the apparatus 100.

As shown in the Figures, the sidewall 108 may be cylindrical, with the top cover 130, the bottom cover (i.e., bottom plate 114), and the top collar 126 all having substantially round or circular footprints, when viewed in a longitudinal direction. (That is, when viewed from the top direction looking down within the plane of the page, in FIG. 1.) The depicted configuration thus results in a substantially right cylindrical housing, as shown, although any additional flanges (e.g., mounting flanges) or other features could be provided for a particular use environment. It is also contemplated that the apparatus 100, or portions thereof, could have curved, linear, curvilinear, or any other desired profiles, for a particular use environment.

The optical device 102 may include at least one of a camera and a camera lens, and may be located wholly within the protected volume 106. For example, a barrel-shaped digital camera may serve as an optical device 102 and provide digital images (e.g., video data) corresponding to a field of view of the camera through the lens cover 130 when mounted within the apparatus 100. The optical device 102 may be threadably attached to the housing cup 104. An example of such attachment may be for the optical device 102 to be screwed into engagement with at least one other surface of the housing cup 104. For example, the laterally thickened center segment 736 of the sidewall 108 may be threaded to receive corresponding threads along the longitudinally extending sides of the optical device 102. Such threadable engagement may provide an easy means of attachment of the optical device 102 to the housing cup 104 and stabilization between the two, as well as providing a way to control the distance between the top of the optical device 102 and the under (bottom) side of the top cover 130. The optical device 102 may be directly or indirectly fixed to a bottom side (e.g., the bottom plate 114) of the housing cup 104, extend upward toward the top cover 130, and be spaced longitudinally apart from the top cover 130.

An interface structure 142 may circumscribe the top cover 130 to suspend the top cover 130 downwardly into the housing cup 104 from the top collar 126, as shown in the first configuration of FIG. 1. The interface structure 142 prevents direct contact between the top cover 130 and the top collar 126. In other words, the interface structure 142 may be at least partially located longitudinally between the top cover 130 and the top collar 126 and prevent direct contact therebetween. The interface structure 142 provides a compliant interface that mitigates, or reduces, transference or transmission of ultrasonic vibrations between the top cover 130 and the top collar 126. The interface structure 142 may be made of flexible material such as, but not limited to, silicone rubber.

The interface structure 142 may be provided to the apparatus 100 as a completed band-type structure and/or may be laid down between the top cover 130 and the top collar 126, in a caulk-type fashion, in a flowable form and permitted to cure in place, during manufacture of the apparatus 100. The interface structure 142 also may prevent water and other contaminants on the top surface of the housing cap 122 from penetrating into the protected volume 106. The interface structure 142 therefore facilitates vibration of the top cover 130 with respect to the sidewall 108, and thus by absorbing the vibratory force can mitigate potential mechanical damage to the structures of the apparatus 100 while removing contaminants and fluids from the upper surface of the top cover 130.

It is contemplated that the material(s) used for the interface structure 142 will have a relatively high mechanical compliance compared to adjacent portions of the apparatus 100. In this way, the interface structure operates to prevent contact forces associated with the top collar 126 from damping or suppressing vibration generated by the ultrasonic transducer 534. Thus, the housing structure does not dampen the vibration of the ultrasonic transducer 534, thereby facilitating removal of fluid and/or other contaminants from the outer surface of the top cover 130.

The previously mentioned threadable engagement between the various portions of the apparatus 100 may also provide some degree of adjustability to the compression of the interface structure 142 against the top cover 130 and/or the top collar 126, to provide a predetermined balance between sealing tightness and compliance properties of the interface structure 142 in the completed apparatus 100. For example, and as is shown in the Figures, the housing cap 122 may at least partially contact, and rest upon (i.e., place weight upon) other structures of the apparatus 100. This example configuration is shown in at least FIGS. 1 and 9-10 as a bottom rim of the ultrasonic transducer 534 being longitudinally adjacent to, and potentially contacting, at least a portion of the central segment 736 of the sidewall 108. That is, the central segment 736 of the sidewall 108 acts, in part, as an orienting feature protruding laterally into the protected volume 106 from a side of the housing cup 104 (while the central segment 736 is also providing a threadable engagement with the optical device 102). Alternately, a relatively small portion of the sidewall 108 or even a separately provided structure (not shown) could be an orienting feature without engaging the optical device 102. Regardless of the precise configuration, however, any provided orienting feature may selectively contact the housing cap 122 for orientation thereof with respect to other structures of the apparatus 100.

Therefore, when the top collar 126 is engaged (e.g., threadably engaged) with the sidewall 108 (e.g., the outer sidewall 124), the top cover 130, interface structure 142, and ultrasonic transducer 534 are longitudinally "sandwiched" between the top collar 126 and the central segment 736 of the sidewall 108. Here, the interface structure 142 mitigates transference of vibration from the ultrasonic transducer 534 by allowing the top cover 130 to indirectly "push off" longitudinally from the central segment 736, and deforming under that longitudinal force to prevent transmission of the longitudinal force from the top cover 130 to the top collar 126.

Figure 9:
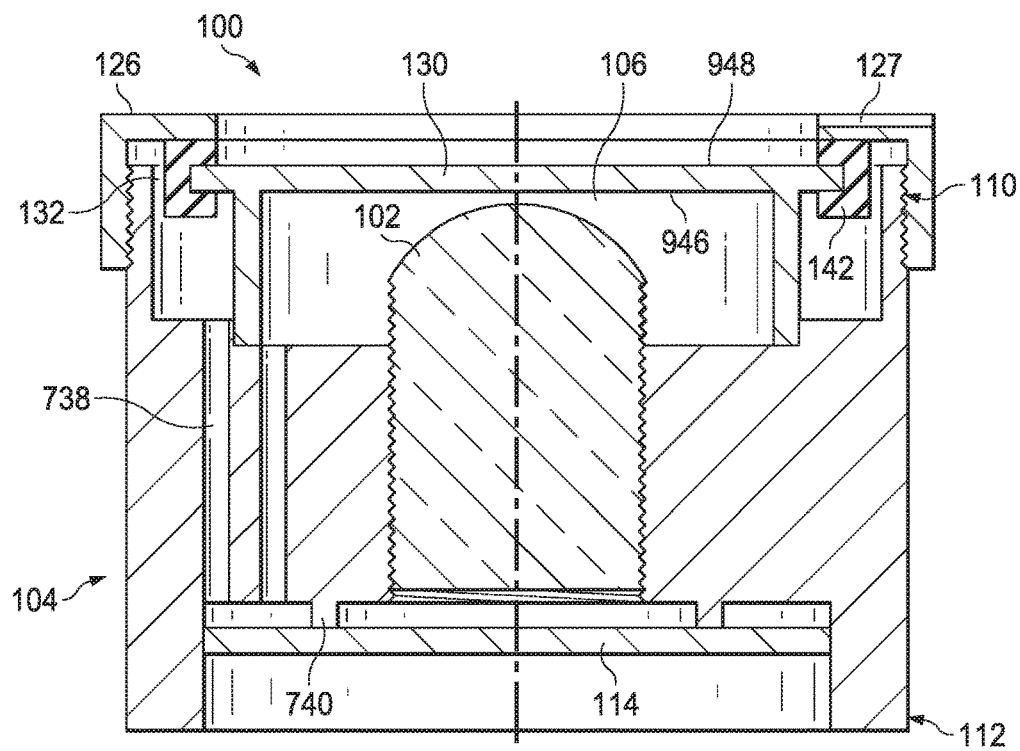
FIG. 9 is a schematic cross-sectional side view of the apparatus of FIG. 1 in an example second example configuration.

A second example configuration of the interface structure 142, which can be used in combination with any desired features of the first configuration, is shown in FIG. 9. In FIG. 9, the top cover 130 has oppositely facing downward and upward top cover surfaces 946 and 948, respectively, longitudinally spaced by a top cover rim 544 (labeled in FIG. 5). The interface structure 142 is a band which laterally encircles the top cover rim 544 of the top cover 130. Because the interface structure 142 of FIG. 9 has a "C"-shaped cross-section, as shown in that Figure, the interface structure thus longitudinally spans the top cover rim 544 to directly longitudinally contact both the downward top cover surface 946 and the upward top cover surface 948, concurrently. The interface structure 142 may both laterally encircle and laterally contact the top cover rim 544, also concurrently with the longitudinal contact with the downward and upward top cover surfaces 946 and 948. This configuration of the interface structure 142, when present, may assist with securely suspending the top cover 130 from the top collar 126 and/or mitigate dampening the ultrasonic vibrations from the ultrasonic transducer 534.

Figure 10:
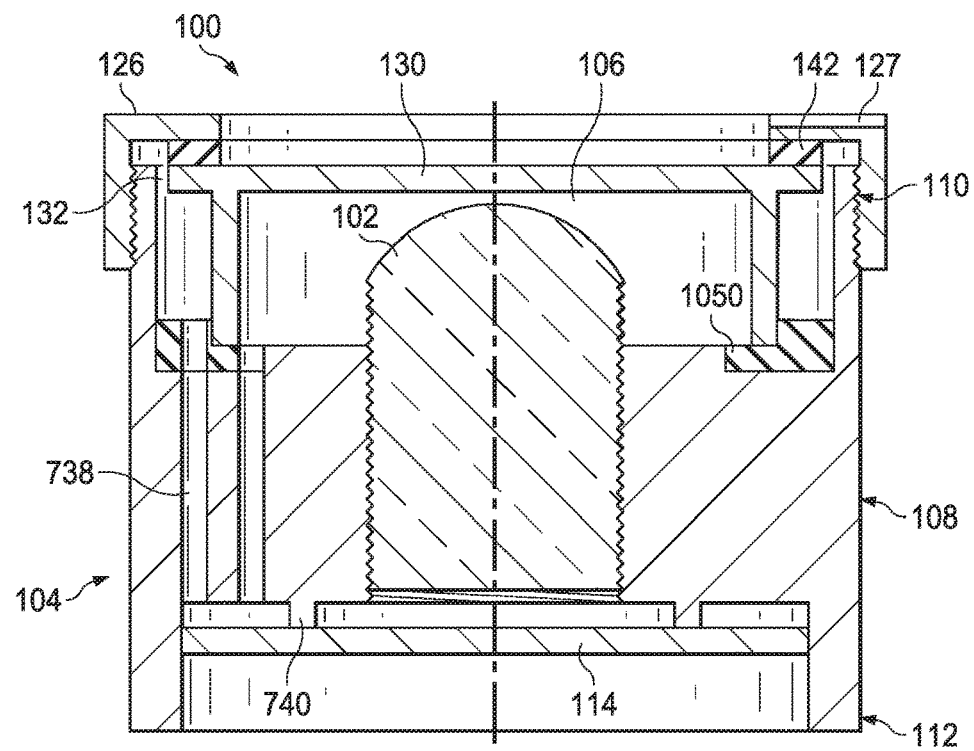
FIG. 10 is a schematic cross-sectional side view of the apparatus of FIG. 1 in an example third example configuration.

A third example configuration of the interface structure 142, which can be used in combination with any desired features of the first and second configurations, is shown in FIG. 10. In FIG. 10, the apparatus 100 includes an insulation collar 1050 concurrently contacting a portion of the housing cap 122 longitudinally spaced from the interface structure 142 and an inside sidewall 108 of the housing cup 104. As shown in FIG. 10, the insulation collar 1050 acts to cushion and/or otherwise affect the interface between the central segment 736 of the sidewall 108 and the ultrasonic transducer 532. To that end, the insulation collar 1050 may be at least partially resilient, and thus act on the bottom portion of the housing cap 122 in a manner similar to the interface structure 142 on the top portion of the housing cap 122. The insulation collar 1050 may also or instead be made of a friction-reducing material, such as, but not limited to, polytetrafluoroethylene, to facilitate relative movement between the housing cap 122 and the housing cup 104. For some use environments of the apparatus 100, the insulation collar 1050 could be made of a material which is harder than the adjacent materials of the sidewall 108 and/or the housing cap 122, thus providing the transducer 534 with a harder surface to push against than those of the sidewall 108 and/or housing cap 122. The insulation collar 1050 may be at least partially made of a material with a higher melting temperature than the material of the sidewall 108 and/or the housing cap 122, to mitigate melting or other adverse wear effects by the transducer 534 on other portions of the apparatus 100.

It is contemplated that a reduced-friction liner ring 152 (shown schematically in FIG. 1) may be located at least one of laterally and longitudinally between the housing cap 122 and the housing cup 104. For example, a liner ring 152 is shown in FIG. 1 as being sandwiched between the interface structure 142 and a bottom edge of the top collar 126. The liner ring 152, when present, could be made from polytetrafluoroethylene or any other desired material or combination of materials (including flowable lubricants), and may assist with facilitating relative movement between adjacent structures of the apparatus 100, such as by damping vibratory motion of the top cover 130 from transference to the housing cup 104 or other structures of the apparatus 100.

Once the apparatus 100 has been assembled into a desirably fluid-tight unit as described above and shown in the Figures, the ultrasonic transducer 534 and/or the optical device 102 can be connected in any desired manner to a controller, power source, computer, or any other device in the ambient space (e.g., through electrical wires passed through the vias 218 and/or thru holes 220). The apparatus may be mounted to a supporting structure (not shown), such as through use of the alignment features 740. The ultrasonic transducer 534 is actuated as desired, which could be at all times, only during operation of the optical device 102, only during predetermined weather conditions, and/or in any other timing, sequence, or pattern. The ultrasonic vibrations will vibrate the top cover 130 very rapidly to break up and expel contaminants (including, but not limited to, particles and fluids) from the upward top cover surface 948. By removing such contaminants, for example, the field of view for the optical device (e.g., a camera) 102 can remain free and clear thereby producing clean images of objects within the field of view. While the vibrations are being produced by the ultrasonic transducer 534, the interface structure 142 mitigates dampening of such vibrations as well as serves to mechanically insulate the interface between the top collar 126 and top cover 130. It is contemplated that the interface structure 142, or any other portions of the apparatus 100 could be periodically inspected and either the entire apparatus 100 or portions thereof replaced as a predetermined amount of undesirable wear occurs.

Figure 11:
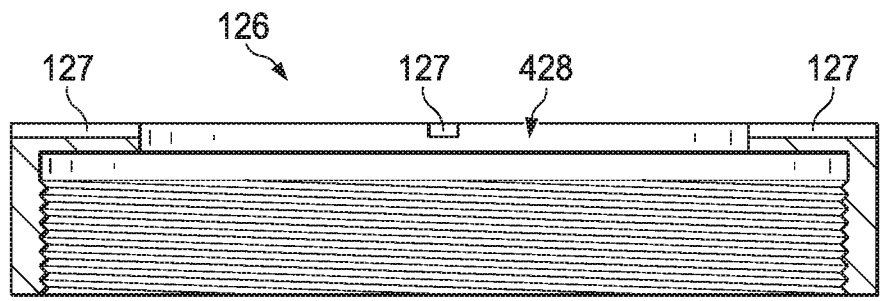
FIG. 11 is a schematic cross-sectional side view of an example component of the apparatus of FIG. 1 in an example fourth example configuration.
Figure 12:
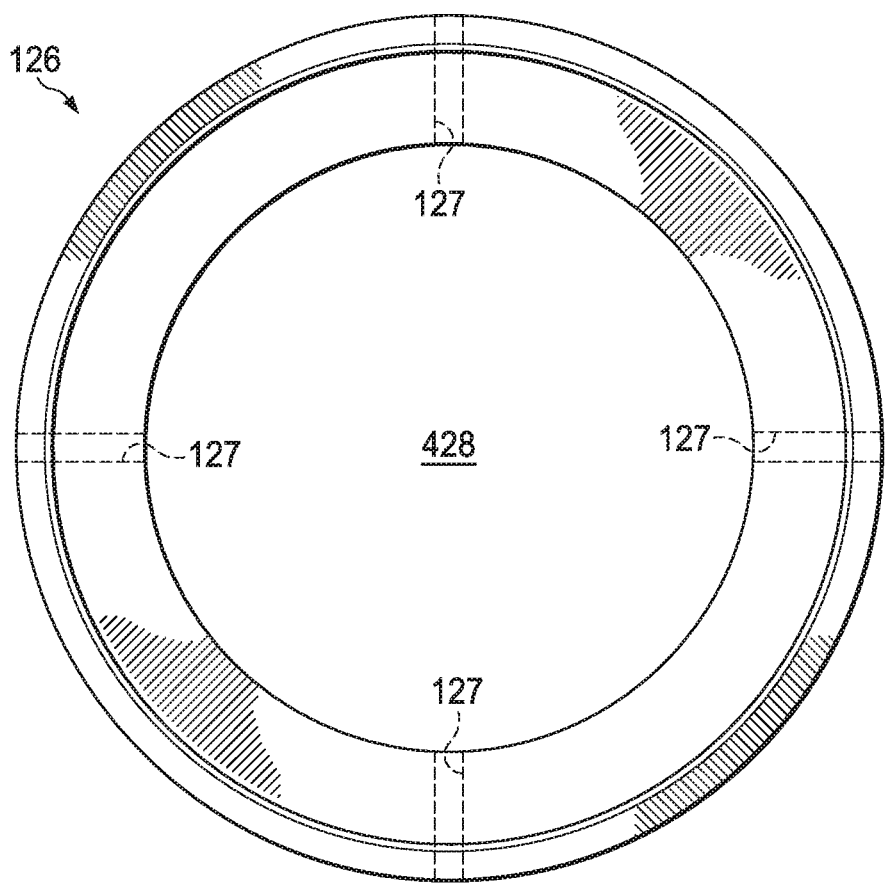
FIG. 12 is a schematic bottom view of the component of FIG. 11 in the example fourth example configuration.

A fourth example configuration of the top collar 126, which can be used in combination with any desired features of the first, second, and/or third configurations, is shown in FIGS. 11-12. In FIGS. 11-12, a plurality of drain channels 127 are provided and are distributed about the top collar top surface at a number of different radial orientations. (Four are shown here, but any desired number is contemplated.) Each drain channel 127 extends longitudinally downward into a top collar top surface and extends at least partially across the top collar top surface laterally outward from the central aperture. The plurality of drain channels 127 facilitate drainage of fluid from the central aperture toward the outer surface of the housing cup 104, which may occur under gravitational influence and/or other forces that may occur when the apparatus 100 is mounted (e.g., to a vehicle) with the longitudinal direction being substantially horizontal to a ground surface, during use.

The single drain channel 127 of the first example configuration may need to be carefully radially aligned during installation in a desired orientation with respect to the housing cup 104 (e.g., located in approximately a "six o'clock" position—substantially at a bottommost area of the installed top collar 126) to ensure that gravity-influenced fluid drainage occurs as intended. In contrast, the radially spaced plurality of drain channels 127 of the fourth example configuration facilitate installation of the top collar 126 in a number of different radial orientations with respect to the housing cup 104 while still providing at least one of the plurality of drain channels in a generally "downward extending" orientation. Accordingly, the fourth example configuration permits the expenditure of less care and precision in assembly than in the first example configuration (which has only one possible downward-facing drain channel 127 orientation) while still resulting in at least one of the plurality of drain channels 127 being in a "bottommost" or "six o'clock" orientation.

What have been disclosed herein are examples. It is, of course, not possible to describe every conceivable combination of components or methodologies, but one of ordinary skill in the art will recognize that many further combinations and permutations are possible. For instance, any structures or features described with reference to one embodiment or configuration could be provided, singly or in combination with other structures or features, to any other embodiment or configuration. As another example, the described structures and components could be made from any suitable material or combinations of materials. Any of the described structures and components could be disposable or reusable as desired for a particular use environment. Additionally, though certain components described herein are shown as having specific geometric shapes, all structures of this disclosure may have any suitable shapes, sizes, configurations, relative relationships, cross-sectional areas, or any other physical characteristics as desirable for a particular application. For example, it is contemplated that the interface structure 142, as with any structure(s) of the apparatus 100, could be substantially rotationally uniform symmetrical as shown (having substantially the same cross-sectional shape/area all around a circumference thereof) or could instead include some irregularities which provide different cross-sectional shapes/areas at different points along the circumference. Accordingly, this disclosure is intended to embrace all such alterations, modifications, and variations that fall within the scope of this application, including the appended claims.

As used herein, the term "includes" means includes but not limited to, the term "including" means including but not limited to. Additionally, where the disclosure or claims recite "a," "an," "a first," or "another" element, or the equivalent thereof, it should be interpreted to include one or more than one such element, neither requiring nor excluding two or more such elements.

What is claimed is:

1. Apparatus, comprising:
   a housing having a top, a closed side and a closed bottom, the housing adapted to enclose an optical device; and
   a housing cap enclosing the top, the housing cap including:
      a top collar having a top surface and an aperture through the top surface, the top surface having a drain channel extending from the aperture at least partially across the top surface,
      a top cover spanning at least the aperture, and
      an interface structure attached between the top collar and the top cover, the interface structure surrounding the top cover and suspending the top cover into the housing from the top collar and preventing direct contact between the top cover and the top collar.

2. The apparatus of claim 1, wherein the housing has an outer sidewall, and the housing cap spans the top of the housing and is attached to the outer sidewall.

3. The apparatus of claim 1, further comprising an ultrasonic transducer attached to the top cover and configured to ultrasonically vibrate the top cover to shed contaminants, the interface structure configured to mitigate a transference of contact forces between the top cover and the top collar.

4. The apparatus of claim 1, wherein the drain channel is a flat-bottomed, constant cross-section void in the top surface.

5. The apparatus of claim 1, wherein the top cover has opposite top and bottom surfaces and a rim therebetween, and the interface structure encircles the rim and directly contacts the opposite top and bottom surfaces.

6. The apparatus of claim 1, wherein the housing has an inside sidewall, a portion of the top cover is spaced from the interface structure, and the apparatus further comprises an insulation collar concurrently contacting the portion and the inside sidewall.

7. The apparatus of claim 1, wherein the bottom of the housing includes a via, a thru hole or a printed circuit board for mechanical or electrical communication through the housing.

8. The apparatus of claim 1, wherein the top surface has multiple drain channels distributed about the top surface at a number of different radial orientations.

9. The apparatus of claim 1, further comprising the optical device fixed to the bottom of the housing, extending upward toward the top cover, and spaced apart from the top cover.

10. The apparatus of claim 1, further comprising a reduced-friction liner ring between the housing cap and the housing.

11. The apparatus of claim 1, wherein the drain channel points to a center of the aperture.

12. An optical device housing, comprising:
- a sidewall having top and bottom sidewall rims, the sidewall enclosing sides of a volume, and the top sidewall rim surrounding a top of the volume;
- a bottom plate spanning the bottom sidewall rim to enclose a bottom of the volume;
- a housing cap enclosing the top, the housing cap including:
  - a top collar surrounding the top sidewall rim, the top collar having a top surface and an aperture through the top surface, and the top surface having a drain channel extending from the aperture at least partially across the top surface,
  - a top cover spanning at least the aperture, and
  - an interface structure attached between the top cover and the top collar, the interface structure surrounding the top cover and preventing direct contact between the top cover and the top collar, and the interface structure configured to mitigate a transference of contact forces between the top cover and the top collar; and
- an ultrasonic transducer attached to the top cover and configured to ultrasonically vibrate the top cover to shed contaminants.

13. The optical device housing of claim 12, wherein at least a portion of the top cover is optically transparent or optically translucent.

14. The optical device housing of claim 12, wherein the bottom plate includes a thru hole extending therethrough to facilitate mechanical or electrical communication between an ambient space and the volume.

15. The optical device housing of claim 12, wherein the bottom plate includes a via, a thru hole or a printed circuit board for mechanical or electrical communication longitudinally through the sidewall.

16. The optical device housing of claim 12, wherein the drain channel is a flat-bottomed, constant cross-section void in the top surface.

17. The optical device housing of claim 12, wherein the drain channel points to a center of the aperture.

18. The optical device housing of claim 12, wherein the top cover has opposite top and bottom surfaces and a top cover rim therebetween, and the interface structure encircles the top cover rim and directly contacts the opposite top and bottom surfaces.

19. The optical device housing of claim 12, wherein the top surface has multiple drain channels distributed about the top surface at a number of different radial orientations.

* * * * *